US010000668B2

(12) United States Patent
Imoto et al.

(10) Patent No.: US 10,000,668 B2
(45) Date of Patent: Jun. 19, 2018

(54) ADHESIVE SHEET

(71) Applicant: NITTO DENKO CORPORATION, Ibaraki-shi, Osaka (JP)

(72) Inventors: Eiichi Imoto, Ibaraki (JP); Yoshio Nakagawa, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days. days.

(21) Appl. No.: 15/029,326

(22) PCT Filed: Jun. 23, 2014

(86) PCT No.: PCT/JP2014/066570
§ 371 (c)(1),
(2) Date: Apr. 14, 2016

(87) PCT Pub. No.: WO2015/056467
PCT Pub. Date: Apr. 23, 2015

(65) Prior Publication Data
US 2016/0272851 A1 Sep. 22, 2016

(30) Foreign Application Priority Data
Oct. 18, 2013 (JP) .................................. 2013-217405

(51) Int. Cl.
| | |
|---|---|
| C09J 7/02 | (2006.01) |
| C08G 18/79 | (2006.01) |
| C09J 133/06 | (2006.01) |
| C08G 18/62 | (2006.01) |
| C09D 175/04 | (2006.01) |
| C08L 75/06 | (2006.01) |
| C09J 133/08 | (2006.01) |

(52) U.S. Cl.
CPC ........ *C09J 7/0285* (2013.01); *C08G 18/6225* (2013.01); *C08G 18/6279* (2013.01); *C08G 18/792* (2013.01); *C09D 175/04* (2013.01); *C09J 7/25* (2018.01); *C09J 7/255* (2018.01); *C09J 7/29* (2018.01); *C09J 133/066* (2013.01); *C08L 75/06* (2013.01); *C09J 133/08* (2013.01); *C09J 2201/162* (2013.01); *C09J 2201/622* (2013.01); *C09J 2203/306* (2013.01); *C09J 2427/006* (2013.01); *C09J 2433/006* (2013.01); *C09J 2471/006* (2013.01); *C09J 2475/006* (2013.01)

(58) Field of Classification Search
None
See application file for complete search history.

(56) References Cited

U.S. PATENT DOCUMENTS

| | | | | |
|---|---|---|---|---|
| 5,965,256 A * | 10/1999 | Barrera | .................. | B05D 5/083 427/407.1 |
| 2003/0026932 A1* | 2/2003 | Johnson | .................. | B32B 15/08 428/40.1 |
| 2004/0229066 A1* | 11/2004 | Ikishima | .................. | C08J 7/047 428/523 |
| 2005/0186415 A1* | 8/2005 | McCormick | ...... | B32B 17/10009 428/336 |
| 2006/0177654 A1* | 8/2006 | Shoshi | .................. | C09J 7/0296 428/354 |
| 2007/0077420 A1* | 4/2007 | Worthen | ............ | C08G 18/4854 428/354 |
| 2008/0199704 A1* | 8/2008 | Ho | .......................... | B32B 7/12 428/412 |
| 2009/0009577 A1* | 1/2009 | Nigam | .................. | B41M 5/502 347/105 |
| 2011/0064900 A1* | 3/2011 | Uesugi | .................. | C09J 7/0264 428/41.3 |
| 2011/0064946 A1* | 3/2011 | Kai | ......................... | C09J 7/026 428/345 |
| 2011/0117364 A1 | 5/2011 | Uesugi et al. | | |
| 2011/0171477 A1* | 7/2011 | Kai | ...................... | C08F 220/36 428/424.4 |
| 2012/0034460 A1 | 2/2012 | Tamada | | |
| 2012/0070659 A1 | 3/2012 | Nakagawa et al. | | |
| 2013/0052461 A1 | 2/2013 | Muta et al. | | |
| 2015/0184038 A1* | 7/2015 | Schaner | ................. | C09J 7/0296 428/41.8 |
| 2016/0168425 A1* | 6/2016 | Imoto | ................. | C08G 18/5015 428/354 |

FOREIGN PATENT DOCUMENTS

| | | |
|---|---|---|
| CN | 102101986 A | 6/2011 |
| EP | 0 635 348 A1 | 1/1995 |

(Continued)

OTHER PUBLICATIONS

Mir Mohammad Alavi Nikje, "Recycling of Polyurethane Wastes", 2016. Smithers Rapra Technology Ltd, pp. 5-6.*
International Search Report for PCT/JP2014/066570 dated Sep. 2, 2014 [PCT/ISA/210].
Extended European Search Report dated May 11, 2017, issued by the European Patent Office in corresponding EP Application No. 14854789.6.
Notification of Reasons for Rejection dated Feb. 9, 2018 from the Japanese Patent Office in counterpart Japanese application No. 2014-128126.
Notification of First Office Action dated Feb. 7, 2018 from the State Intellectual Property Office of the P.R.C. in counterpart application No. 201480057075.1.

*Primary Examiner* — Anish Desai
(74) *Attorney, Agent, or Firm* — Sughrue Mion, PLLC

(57) ABSTRACT

[Problem] This is to provide an adhesive sheet having curved surface followability and chemical resistance.

[Means for solving] The adhesive sheet is an adhesive sheet having at least a substrate and an adhesive layer, a load at the time of 5% elongation of the substrate is 15 N/cm or less, a stress relaxation rate of the substrate by elongating to 10%, stopping the elongation at that state and after lapsing 600 seconds is 40% or more and 100% or less, and a chemical weight increased ratio of the substrate is 60% or less.

12 Claims, No Drawings

(56) References Cited

FOREIGN PATENT DOCUMENTS

| EP | 2 565 245 A2 | 3/2013 |
|---|---|---|
| EP | 3 031 874 A1 | 6/2016 |
| JP | 59-041376 A | 3/1984 |
| JP | 2005-272558 A | 10/2005 |
| JP | 2007-70401 A | 3/2007 |
| JP | 2008-539107 A | 11/2008 |
| JP | 2011-30601 A | 2/2011 |
| JP | 2011-249613 A | 12/2011 |
| JP | 2012-62454 A | 3/2012 |
| JP | 2013-49852 A | 3/2013 |
| WO | 2006/118883 A2 | 11/2006 |
| WO | 2010/116627 A1 | 10/2010 |

\* cited by examiner

ADHESIVE SHEET

CROSS REFERENCE TO RELATED APPLICATIONS

This application is a National Stage of International Application No. PCT/JP2014/066570, filed on Jun. 23, 2014, which claims priority from Japanese Patent Application No. 2013-217405, filed on Oct. 18, 2013, the contents of all of which are incorporated herein by reference in their entirety.

TECHNICAL FIELD

The present invention relates to an adhesive sheet, in particular, to an adhesive sheet for protection having curved surface followability and chemical resistance.

BACKGROUND ART

In the automobile and aircraft industries, for example, an adhesive sheet is sometimes adhered to the coating surface of a body of an automobile, etc., for preventing from damage or for marking, etc. This adhesive sheet is directly adhered onto the coating surface by manual operation using a squeegee, etc., but there are problems that the sheet cannot neatly be adhered to the portion having a severe three-dimensionally curved surface, it is repelled or floating is generated after the adhesion. In JP 2005-272558A, there is disclosed an adhesive sheet in which an adhesive layer is provided to a laminated material of a polycarbonate-based polyurethane hard layer and a polyurethane soft layer, but flexibility thereof is insufficient.

In addition, in the adhesive sheet for protection to which a coating layer has been provided for improving sliding property of the surface, followability is worsened at the portion of a severe three-dimensionally curved surface, whereby a malfunction is generated that adhesion of the sheet to an adherend having a three-dimensionally curved surface with followability becomes difficult.

Also, chemicals are sometimes attached to the adhesive sheet adhered for the purpose of protecting the surface, etc., and in the adhesive sheet for protection of, for example, an automobile, an aircraft, etc., an organic solvent such as gasoline, etc., had been adhered in some cases. Accordingly, the adhesive sheet for protection is sometimes required to have chemical resistance to the chemicals such as an organic solvent, etc.

PRIOR ART DOCUMENTS

Patent Documents

Patent document 1: JP Sho. 59-41376A
Patent document 2: JP 2005-272558A

SUMMARY OF THE INVENTION

Problems to be Solved by the Invention

The present invention has been accomplished to solve the above-mentioned problems, and an object of the present invention is to provide an adhesive sheet having curved surface followability and excellent chemical resistance.

Means to Solve the Problems

The adhesive sheet of the present invention is an adhesive sheet which comprises at least a substrate and an adhesive layer, the substrate has a substrate layer, a load at the time of 5% elongation of the substrate is 15 N/cm or less, a stress relaxation rate of the substrate by elongating to 10%, stopping the elongation at that state and after lapsing 600 seconds is 40% or more and 100% or less, and a chemical weight increased ratio of the substrate is 60% or less.

Here, a load at the time of 5% elongation of the substrate is preferably 1 N/cm or more and 15 N/cm or less.

In the present invention, the substrate layer preferably contains at least a urethane-based polymer.

Here, the urethane-based polymer constituting the substrate layer is preferably an ester-based thermoplastic polyurethane.

In the present invention, a Shore hardness of the substrate layer is preferably 80 A or more and 65 D or less.

In the present invention, the substrate preferably has a surface protective layer and a substrate layer, and the surface protective layer is provided at the outermost surface of the adhesive sheet.

In the present invention, the surface protective layer preferably comprises an acrylic-based resin, a fluorine-based resin or a urethane-based polymer as a main component(s).

In the present invention, the acrylic-based resin preferably contains a (meth)acrylic-based polymer having a hydroxyl value of 20 to 120 (KOH mg/g).

The above-mentioned any of the adhesive sheets is preferably used as a protective sheet for protecting the surface of an adherend.

Effects of the Invention

According to the present invention, an adhesive sheet having good curved surface followability and having excellent chemical resistance could be realized. In particular, it could be also realized an adhesive sheet which has followability to a curved surface, could well follow to the portion having a severe three-dimensionally curved surface, and could be neatly adhered without repelling or floating after the adhesion.

EMBODIMENTS TO CARRY OUT THE INVENTION

In the following, the present invention will be explained in detail.

The adhesive sheet of the present invention is an adhesive sheet having a substrate and an adhesive layer, and a chemical weight increased ratio of the substrate is 60% or less, preferably 50% or less, more preferably 40% or less, and particularly preferably 30% or less. Incidentally, the lower limit value is ideally 0, and it is, for example, 3% or more. If the chemical weight increased ratio of the substrate is 60% or less, the adhesive sheet tends to be not peeled off even when it is exposed to chemicals such as an organic solvent, etc.

In the present invention, the chemical resistance is designated by the chemical weight increased ratio. The chemical weight increased ratio is shown by a weight increased ratio when an object to be tested (a sample) is dipped in a chemical such as an organic solvent, etc., and measured the weight of the object after 30 minutes passed. As the chemicals such as an organic solvent, etc., there may be mentioned an organic solvent in which a (commercially available) regular gasoline and ethanol had been mixed with a ratio of 90% by weight and 10% by weight. In particular, the gasoline is a material usually supplemented from a fuel injection port as a fuel for an automobile, etc., and easily attached to the body of an automobile so that it is extremely effective.

The adhesive sheet of the present invention satisfies specific physical property value, i.e., a load at the time of 5% elongation of the substrate is 15 N/cm or less. In addition, a lower limit value of the load at the time of 5% elongation of the substrate is preferably 1 N/cm or more, further preferably 1 N/cm or more and 12 N/cm or less, and particularly preferably 1 N/cm or more and 10 N/cm or less. Provided that the load of the substrate at the time of 5% elongation is a value measured at the state in which an acrylic-based adhesive layer with a thickness of 50 μm is provided onto the substrate, as specifically explained in Examples. By existing the load of the substrate at the time of 5% elongation within the specific range, an adhesive sheet excellent in curved surface followability to the portion having a three-dimensionally curved surface can be easily realized. An index of flexibility with regard to such an SS physical property (a load at the time of 5% elongation) is a technical thought firstly find out by the present inventors, which has never been used as an index as of today and is an excellent index.

In addition, the substrate is required to satisfy the specific stress relaxation property. That is, a stress relaxation rate in which after subjecting to 10% elongation, the substrate is allowed to stand for 600 sec at the state of stopping the elongation is required to be 40% or more and 100% or less, preferably 60% or more and 100% or less. Provided that the stress relaxation rate of the substrate is a value measured at the state in which an acrylic-based adhesive layer with a thickness of 50 μm is provided onto the substrate, as specifically explained in Examples.

In the present invention, the substrate may be a single layer sheet comprising a substrate layer alone, and may be a laminated sheet comprising a substrate layer and a surface protective layer. Provided that the surface protective layer is provided at an uppermost surface of the adhesive sheet. Also, when the adhesive sheet of the present invention is required to have weather resistance, the substrate preferably comprises a non-yellowing resin, and when it comprises a laminated sheet structure, each of the surface protective layer and the substrate layer preferably comprises a non-yellowing resin.

In the present invention, for example, when the substrate is a material which satisfies the load at the time of 5% elongation of 15 N/cm or less and the stress relaxation rate of 40 to 100%, the material(s) of the substrate layer is/are not specifically limited, and the substrate layer preferably contains at least a urethane-based polymer as an effective ingredient. In the viewpoint of chemical resistance, such a urethane-based polymer preferably employed is an ester-based thermoplastic polyurethane.

The ester-based thermoplastic polyurethane to be preferably used in the present invention may be mentioned, for example, an adipate-ester-based thermoplastic polyurethane, a polycaprolactone-ester-based thermoplastic polyurethane, etc.

In the present invention, the substrate layer preferably has a Shore hardness (JIS K6253: 2006) of 80 A or more and 65 D or less, further preferably 85 A or more and 97 A or less.

Also, a thickness of the substrate layer may be optionally selected depending on the purpose, etc., preferably 50 μm or more, and particularly preferably 100 μm or more. In addition, the upper value of the thickness is preferably about 1 mm or so. The thickness of the substrate layer is, for example, in the case of the chipping use to be used for protecting the body of an automobile, preferably about 50 to 800 μm or so, more preferably about 100 to 600 μm or so. Further, in the case of the use for an aircraft, it is about 50 to 1,000 μm or so, more preferably about 200 to 800 μm or so. Moreover, in the case of the use for a motorcycle, it is preferably about 50 to 800 μm or so, more preferably about 100 to 600 μm or so.

In the present invention, it is preferred that the Shore hardness and the thickness of the substrate layer are optionally determined so that the substrate satisfies the numerical ranges of the above-mentioned SS physical properties.

Incidentally, in the present invention, the term "film" is defined to be a concept including a sheet, and the term "sheet" is defined to be a concept including a film. In addition, in the present invention, the term "(meth)acrylic" such as a (meth)acrylic-based polymer and a (meth)acrylic acid-based monomer is defined to be a concept collectively calling methacrylic and acrylic. Further, even when it is mentioned as "acrylic", it is made a concept including methacrylic if there is no problem in general common sense.

In the present invention, the substrate may be a laminated sheet having a substrate layer and a surface protective layer. Provided that the surface protective layer is provided at an outermost surface of the adhesive sheet. The surface protective layer preferably comprises a fluorine-based resin, a urethane-based polymer, an acrylic-based resin, etc., as an effective ingredient(s). Here, the terms "as effective ingredients" mean that the resin components occupy 50% by weight or more in the surface protective layer after the formation thereof, preferably occupy 55% by weight or more, and more preferably 60% by weight or more. Incidentally, in the present invention, when it is designated as the effective ingredient, these have the same meanings as mentioned above.

The fluorine-based resin to be used in the surface protective layer may be preferably mentioned those having a fluoroethylene vinyl ether alternating copolymer and, for example, preferably having a fluoroethylene vinyl ether alternating copolymer represented by the following formula (I).

[Formula 1]

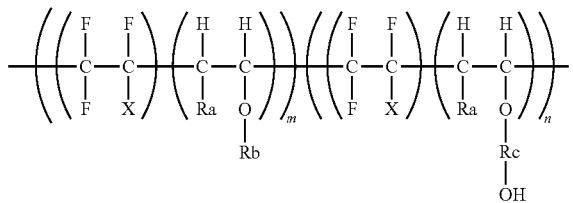

In the above-mentioned formula (I), X represents fluorine, chlorine or bromine, Ra represents hydrogen or a C1 to C10 alkyl group, Rb represents a C1 to C16 alkyl group, Rc represents a C1 to C16 alkylene group, m and n each represent an integer, and selected in the range in which the weight average molecular weight of the fluoroethylene vinyl ether alternating copolymer becomes 1,000 to 2,000,000.

A weight average molecular weight of the fluoroethylene vinyl ether alternating copolymer is 1,000 to 2,000,000, preferably 5,000 to 1,000,000, and more preferably 10,000 to 500,000. In the present invention, m and n in the above-mentioned formula (I) is selected in the range in which the weight average molecular weight of the fluoroethylene vinyl ether alternating copolymer becomes 1,000 to 2,000,000.

The weight average molecular weight of the fluoroethylene vinyl ether alternating copolymer can be measured by the GPC method. The measurement method of the GPC method is shown below. That is, the fluoroethylene vinyl ether alternating copolymer is adjusted so that it becomes 2.0 g/L by using a THF solution, and then, allowed to stand for 12 hours. Thereafter, this solution is filtered through a 0.45 µm membrane filter, and the filtrate is subjected to GPC measurement by using "HLC-8120GPC" manufactured by Tosoh Corporation as an analytical device, under the following mentioned measurement conditions.

Measurement Conditions:

| Column | TSK gel GMH-H(S) × 2 |
|---|---|
| Column size | 7.8 mm I.D. × 300 mm |
| Eluent | THF |
| Flow amount | 0.5 mL/min |
| Detector | RI |
| Column temperature | 40° C. |
| Injection amount | 100 µL |

The urethane-based polymer to be used for the formation of the surface protective layer is preferably an aqueous-based urethane polymer or a solvent-based urethane polymer. The urethane polymer is necessary to be liquified for the processing, etc., the liquified urethane using an organic solvent such as toluene, etc., is called as a solvent-based urethane polymer, and many of the urethane polymers are an organic solvent-based material. On the other hand, the aqueous-based urethane polymer means a liquefied urethane using water in place of the organic solvent, and the aqueous-based urethane polymer can be liquefied without using an organic solvent so that it can be said to be a material friendly to the environment.

The aqueous-based urethane polymer to be preferably used in the present invention may be mentioned, for example, a carbonate-based polymer, a polycarbonate-based polymer, an ester-based polymer, an ether-based polymer, an ester/acrylic-based polymer, etc.

The carbonate-based aqueous-based urethane polymer may be mentioned, for example, trade name: "F-8082D" (100% modulus 24 N/mm$^2$), trade name: "Superflex 420" (100% modulus 17 N/mm$^2$), trade name: "F-2954D" (100% modulus 5 N/mm$^2$), trade name: "F-2954D-5" (100% modulus 12 N/mm$^2$), trade name: "Superflex 470" (100% modulus 2.5 N/mm$^2$), trade name: "Superflex 460" (100% modulus 0.9 N/mm$^2$), "F-2968D" (100% modulus 1.5 N/mm$^2$), etc., all available from DKS Co., Ltd., as commercially available products, the ester-based aqueous-based urethane polymer may be mentioned trade name: "HUX 232" (100% modulus 25 N/mm$^2$), trade name: "HUX-380" (100 modulus 8.4 N/mm$^2$), trade name: "HUX-210" (100% modulus 2.1 N/mm$^2$), etc., all available from ADEKA CORPORATION as commercially available products, the polycarbonate-based aqueous-based urethane polymer may be mentioned trade name: "HUX-561" (100% modulus 5 N/mm$^2$), trade name: "HUX-564", etc., all available from ADEKA CORPORATION as commercially available products, the ether based aqueous-based urethane polymer may be mentioned trade name: "HUX-350" (100% modulus 25 N/mm$^2$), trade name: "HUX-550" (100% modulus 27 N/mm$^2$ (10%)), etc., all available from ADEKA CORPORATION as commercially available products, and the ester/acrylic-based aqueous-based urethane polymer may be mentioned trade name: "HUX 401" (100% modulus 19 N/mm$^2$), etc., available from ADEKA CORPORATION as commercially available products.

In the present invention, when the surface protective layer contains an acrylic-based resin as an effective ingredient, the acrylic-based resin preferably contains a (meth)acrylic-based polymer having a hydroxyl value of 20 to 120 (KOH mg/g), and the surface protective layer is preferably a layer containing a crosslinked product formed by a (meth)acrylic-based polymer having a hydroxyl value 20 to 120 (KOH mg/g) and a crosslinking agent. The hydroxyl value of the (meth)acrylic-based polymer is more preferably 20 to 100 (KOH mg/g), further preferably 20 to 80 (KOH mg/g), particularly preferably 30 to 70 (KOH mg/g), and most preferably 40 to 60 (KOH mg/g). By using the (meth)acrylic-based polymer having a hydroxyl value of 20 to 120 (KOH mg/g), a crosslinking density of the surface protective layer can be heightened whereby permeation of the solvent into the substrate can be effectively prevented. If the hydroxyl value of the (meth)acrylic-based polymer is less than 20 (KOH mg/g), an effect of solvent resistance cannot sufficiently be obtained in some cases, while if the hydroxyl value exceeds 120 (KOH mg/g), flexibility is likely poor whereas it is excellent in solvent resistance.

In the present invention, as the (meth)acrylic-based polymer forming the surface protective layer, a material having a hydroxyl value of 20 to 120 (KOH mg/g) can be used without any specific limitation.

Provided that, in the present invention, the acrylic-based resin for forming the surface protective layer is preferably used a HALS-hybrid (meth)acrylic-based polymer. The HALS-hybrid (meth)acrylic-based polymer is an acrylic-based polymer in which a reaction type hindered amine-based photostabilizer (HALS: Hinderd Amine Light Stabilizer) and a reaction type UVA (ultraviolet absorber) are copolymerized. By using the HALS-hybrid (meth)acrylic-based polymer, long term weather resistance can be provided to the surface protective layer.

To satisfy the requirement of improving weather resistance, it has been investigated to use various kinds of weather resistance improving agents including UVA (ultraviolet absorber). More specifically, an ultraviolet absorber, a photostabilizer, an antioxidant, a peroxide decomposing agent, a quencher, etc., are preferably used. Among these, effects of the hindered amine light stabilizer and the ultraviolet absorber are remarkable, and accordingly, these have widely been used. For improving weather resistance of the resins such as an olefin, a urethane, a polyester, etc., which are base resins of general-purpose plastic products, addition of the photostabilizer and/or the ultraviolet absorber is essential, and these act extremely effectively. However, the photostabilizer or the ultraviolet absorber is volatilized at the time of molding processing at high temperature, or eluted into a liquid (water, detergent, etc.) to be contacted with exposure for a long period of time, so that lowering in the effect cannot be avoided. Furthermore, in the form of a coating film, a thickness of the coating film is thin with a thickness of several µm to several ten µm, and an addition type photostabilizer or an addition type the ultraviolet absorber which is easily transferable is eluted within a short period of time, whereby there is a problem that continuity of the effect is poor.

Thus, for preventing from volatilization or elution of the photostabilizer or the ultraviolet absorber, and further for bringing out of the functions of these additives effectively, it is most preferred that a reaction type photostabilizer or a reaction type ultraviolet absorber is used with a polymer as a binder with good combination.

The surface protective layer constituting the substrate of the present invention can be formed by adding a crosslinking agent to a resin (a fluorine-based resin, a urethane-based polymer, an acrylic-based resin) for forming the above-mentioned surface protective layer, and also adding a diluting solvent, etc., depending on necessity, to prepare a coating solution, and it is coated onto the substrate layer, etc., to form a surface protective layer. Or else, a surface protective layer is formed onto a temporary support in a film state, and overlapping with the substrate layer to form a substrate, or a laminated material of the substrate and the surface protective layer may be formed by the other methods. That is, for example, a coating solution containing the (meth)acrylic-based polymer and the crosslinking agent, etc., is coated onto at least one surface of the substrate layer, and heat cured to make a crosslinked material with a three-dimensionally crosslinked structure to obtain a surface protective layer.

The crosslinking agent to be used for the formation of the surface protective layer of the present invention may be mentioned an isocyanate-based crosslinking agent, an oxazoline-based crosslinking agent, etc.

The isocyanate-based crosslinking agent may be mentioned, for example, a di-functional isocyanate such as hydrogenated xylylene diisocyanate, hexamethylene diisocyanate, isophorone diisocyanate, hydrogenated diphenylmethane diisocyanate, ethylene diisocyanate, 1,4-tetramethylene diisocyanate, trimethylhexamethylene diisocyanate, norbornene diisocyanate, Duranate AE700 (available from Asahi Kasei Chemicals Corporation), etc., a tri-functional isocyanate such as Desmodur N3200 (available from Sumika Bayer Urethane Ltd.), Coronate L (available from Nippon Polyurethane Industry Co., Ltd.), Coronate HL (available from Nippon Polyurethane Industry Co., Ltd.), Coronate HX (available from Nippon Polyurethane Industry Co., Ltd.), Takenate D-140N (available from Mitsui Chemical Polyurethanes Inc.), Takenate D-127 (available from Mitsui Chemical Polyurethanes Inc.), Takenate D-110N (available from Mitsui Chemical Polyurethanes Inc.), Duranate TSE-100 (available from Asahi Kasei Chemicals Corporation), Duranate E402 (available from Asahi Kasei Chemicals Corporation), Duranate E405 (available from Asahi Kasei Chemicals Corporation), Sumidur N3300 (available from Sumika Bayer Urethane Ltd.), etc. Among these, hexamethylene diisocyanate non-yellowing type polyisocyanate may be mentioned as a preferred material. Also, the aliphatic-based diisocyanate or the oxazoline-based crosslinking agent may be mentioned, for example, EPOCROS WS-700 (available from Nippon Shokubai Co., Ltd.), etc., as commercially available products.

In the present invention, the surface protective layer may further contain a catalyst. The catalyst to be used may be mentioned, for example, dibutyltin dilaurate, etc., and trade name: "OL1" available from Tokyo Fine Chemical CO., LTD., can be commercially obtained.

Also, a coating solution for the surface protective layer may be formed by using a solvent, if necessary. The solvent to be used may be mentioned, for example, toluene, methyl ethyl ketone, hexane, xylene, ethyl acetate, etc., and two or more kinds may be used in combination.

In the present invention, in the structure in which the substrate comprises a surface protective layer formed onto at least one of the surfaces of the substrate layer, various kinds of discharging treatment, anchor coating treatment, etc., may be applied to the surface of the substrate layer for improving adhesiveness between the substrate layer and the surface protective layer.

In the present invention, a thickness of the surface protective layer is preferably 2 to 50 μm, more preferably 5 to 40 μm, and further preferably 8 to 30 μm. If the thickness of the surface protective layer is less than 2 μm, a defective portion(s) at which no surface protective layer is formed such as a pin hole(s), etc., is/are likely generated, and characteristics of the surface protective layer cannot sufficiently be developed in some cases. If it exceeds 50 μm, physical properties of the surface protective layer lower physical properties of the substrate layer in some cases.

To the respective layers of the adhesive sheet of the present invention, that is, to the substrate layer, the surface protective layer, the adhesive layer, etc., additives generally used, for example, an ultraviolet absorber, an antioxidant, an antiaging agent, a filler, a pigment, a colorant, a flame retardant, an antistatic agent, a photostabilizer, a levelling agent, a thickener, etc., may be added within the range which does not impair the effect of the present invention, if necessary. These additives may be used with a usual amount depending on the kind thereof.

When an ultraviolet absorber is added, the ultraviolet absorber is preferably added to the substrate layer or the surface protective layer. The ultraviolet absorber (UVA) may be mentioned, for example, as the benzotriazole-based ultraviolet absorber, 2-(2-hydroxy-5-tert-butylphenyl)-2H-benzotriazole (for example, "TINUVIN PS" available from Ciba Japan, K.K.), an ester compound of benzenepropanoic acid and 3-(2H-benzotriazol-2-yl)-5-(1,1-dimethylethyl)-4-hydroxy(C7 to C9 branched and linear alkyl) (for example, "TINUVIN 384-2" available from Ciba Japan, K.K.), a mixture of octyl-3-[3-tert-butyl-4-hydroxy-5-(5-chloro-2H-benzotriazol-2-yl)phenyl]propionate and 2-ethylhexyl-3-[3-tert-butyl-4-hydroxy-5-(5-chloro-2H-benzotriazol-2-yl)phenyl]-propionate (for example, "TINUVIN 109" available from Ciba Japan, K.K.), 2-(2H-benzotriazol-2-yl)-4,6-bis(1-methyl-1-phenylethyl)phenol (for example, "TINUVIN 900" available from Ciba Japan, K.K.), 2-(2H-benzotriazol-2-yl)-6-(1-methyl-1-phenylethyl)-4-(1,1,3,3-tetramethylbutyl)phenol (for example, "TINUVIN 928" available from Ciba Japan, K.K.), a reaction product of methyl-3-(3-(2H-benzotriazol-2-yl)-5-tert-butyl-4-hydroxyphenyl)propionate and polyethylene glycol 300 (for example, "TINUVIN 1130" available from Ciba Japan, K.K.), 2-(2H-benzotriazol-2-yl)-p-cresol (for example, "TINUVIN P" available from Ciba Japan, K.K.), 2-[5-chloro(2H)-benzotriazol-2-yl]-4-methyl-6-(tert-butyl)phenol (for example, "TINUVIN 326" available from Ciba Japan, K.K.), 2-(2H-benzotriazol-2-yl)-4,6-di-tert-pentylphenol (for example, "TINUVIN 328" available from Ciba Japan, K.K.), 2-(2H-benzotriazol-2-yl)-4-(1,1,3,3-tetramethylbutyl)phenol (for example, "TINUVIN 329" available from Ciba Japan, K.K.), 2-2'-methylenebis[6-(2H-benzotriazol-2-yl)-4-(1,1,3,3-tetramethylbutyl)-phenol] (for example, "TINUVIN 360" available from Ciba Japan, K.K.), a reaction product of methyl-3-(3-(2H-benzotriazol-2-yl)-5-tert-butyl-4-hydroxyphenyl) propionate and polyethylene glycol 300 (for example, "TINUVIN 213" available from Ciba Japan, K.K.), 2-(2H-benzotriazol-2-yl)-6-dodecyl-4-methylphenol (for example, "TINUVIN 571" available from Ciba Japan, K.K.), 2-[2-hydroxy-3-(3,4,5,6-tetrahydrophthalimide-methyl)-5-methylphenyl]benzotriazole (for example, "Sumisorb 250" available from Sumitomo Chemical Co., Ltd.), 2,2'-methylenebis [6-(benzotriazol-2-yl)-4-tert-octylphenol] (for example, "ADKSTAB LA31" available from ADEKA CORPORATION), etc. Also, a water dispersion type benzotriazole-based ultraviolet absorber may be mentioned "UC-606" available from ADEKA CORPORATION, etc., as a commercially available product.

Also, the hydroxyphenyltriazine-based ultraviolet absorber may be mentioned, for example, a reaction product of 2-(4,6-bis(2,4-dimethylphenyl)-1,3,5-triazin-2-yl)-5-hydroxyphenyl and [(C10 to C16, mainly C12 to C13 alkyloxy)methyl]oxirane (for example, "TINUVIN 400" available from Ciba Japan, K.K.), a reaction product of 2-(2,4-dihydroxyphenyl)-4,6-bis-(2,4-dimethylphenyl)-1,3,5-triazine and (2-ethylhexyl)-glycidic acid ester (for example, "TINUVIN 405" available from Ciba Japan, K.K.), 2,4-bis [2-hydroxy-4-butoxyphenyl]-6-(2,4-dibutoxyphenyl)-1,3,5-triazine (for example, "TINUVIN 460" available from Ciba Japan, K.K.), 2-(4,6-diphenyl-1,3,5-triazin-2-yl)-5-[(hexyl) oxy]-phenol (for example, "TINUVIN 1577" available from Ciba Japan, K.K.), 2-(2-hydroxy-4-[1-octyloxycarbonylethoxy]phenyl)-4,6-bis(4-phenylphenyl)-1,3,5-triazine (for example, "TINUVIN 479" available from Ciba Japan, K.K.), etc.

The benzophenone-based ultraviolet absorber may be mentioned, for example, "CHIMASSORB 81" available from Ciba Japan, K.K., etc. Also, the benzoate-based ultraviolet absorber may be mentioned, for example, 2,4-di-tert-butylphenyl-3,5-di-tert-butyl-4-hydroxybenzoate (for example, "TINUVIN 120" available from Ciba Japan, K.K.), etc.

In the present invention, the above-mentioned ultraviolet absorbers may be used alone or in combination of two or more kinds.

When the ultraviolet absorber is added to the substrate layer, a total amount of the ultraviolet absorber to be used is preferably 0.1% by weight or more and 4.0% by weight or less based on 100% by weight of the substrate layer, more preferably 0.5% by weight or more and 2.0% by weight or less. If the content of the ultraviolet absorber is 0.1% by weight or more, absorption of the ultraviolet ray causing deterioration or coloring is sufficient, while if it is 4.0% by weight or less, no coloring by the ultraviolet absorber itself is caused.

The photostabilizer to be used in the present invention may be mentioned a hindered amine light stabilizer (HALS), a water dispersion type photostabilizer, etc. The hindered amine light stabilizer to be used in the present invention may be mentioned, for example, a polymerized product of dimethyl succinate and 4-hydroxy-2,2,6,6-tetramethyl-1-piperidine ethanol (for example, "TINUVIN 622" available from Ciba Japan, K.K.), a 1:1 reaction product of a polymerized product of dimethyl succinate and 4-hydroxy-2,2,6,6-tetramethyl-1-piperidine ethanol with N,N',N'',N'''-tetrakis-(4, 6-bis-(butyl-(N-methyl-2,2,6,6-tetramethylpiperidin-4-yl) amino)-triazin-2-yl)-4,7-diazadecane-1,10-diamine (for example, "TINUVIN 119" available from Ciba Japan, K.K.), a polycondensate of dibutylamine, 1,3-triazine, N,N'-bis(2,2,6,6-tetramethyl-4-piperidyl-1,6-hexamethylenediamine and N-(2,2,6,6-tetramethyl-4-piperidyl)butylamine (for example, "TINUVIN 2020" available from Ciba Japan, K.K.), poly[{6-(1,1,3,3-tetramethylbutyl)amino-1,3,5-triazin-2,4-diyl} {2,2,6,6-tetramethyl-4-piperidyl}imino]hexamethylene{(2,6,6-tetramethyl-4-piperidyl)imino}) (for example, "TINUVIN 944" available from Ciba Japan, K.K.), a mixture of bis(1,2,2,6,6-pentamethyl-4-piperidyl) sebacate and methyl 1,2,2,6,6-pentamethyl-4-piperidylsebacate (for example, "TINUVIN 765" available from Ciba Japan, K.K.), bis(2,2,6,6-tetramethyl-4-piperidyl)sebacate (for example, "TINUVIN 770" available from Ciba Japan, K.K.), a reaction product of decanedioic acid bis(2,2,6,6-tetramethyl-1-(octyloxy)-4-piperidinyl) ester (1,1-dimethylethylhydroperoxide) and octane (for example, "TINUVIN 123" available from Ciba Japan, K.K.), bis(1,2,2,6,6-pentamethyl-4-piperidyl)[[3,5-bis(1,1-dimethylethyl)-4-hydroxyphenyl]methyl]butyl malonate (for example, "TINUVIN 144" available from Ciba Japan, K.K.), a reaction product of cyclohexane and peroxy N-butyl-2,2,6,6-tetramethyl-4-piperidineamine-2,4,6-trichloro-1,3,5-triazine with 2-amino ethanol (for example, "TINUVIN 152" available from Ciba Japan, K.K.), a mixture of bis(1,2,2,6,6-pentamethyl-4-piperidyl)sebacate and methyl-1,2,2,6,6-pentamethyl-4-piperidylsebacate (for example, "TINUVIN 292" available from Ciba Japan, K.K.), etc. Also, a water dispersion type photostabilizer may be mentioned "UC-606" available from ADEKA CORPORATION, etc., as a commercially available product.

In the present invention, the substrate may be laminated with the other film(s) to the substrate layer within the range which does not impair the effect of the present invention. A material(s) for forming the other film(s) may be mentioned, for example, a thermoplastic resin including a polyester-based resin such as a polyethylene terephthalate (PET), etc., a polyolefin-based resin such as a polyethylene (PE), a polypropylene (PP), etc., a polyimide (PI), a polyether ether ketone (PEEK), a polyvinyl chloride (PVC), a polyvinylidene chloride-based resin, a polyamide-based resin, a polyurethane-based resin, a polystyrene-based resin, an acrylic-based resin, a fluorine-based resin, a cellulose-based resin, a polycarbonate-based resin, etc., as well as a thermosetting resin, etc.

The adhesive sheet of the present invention preferably has a constitution that the substrate has an adhesive layer on one of the surfaces thereof, and it may be a constitution that the substrate has a substrate layer and a surface protective layer. In such a case, it is preferred to employ a constitution that a surface protective layer is provided as the outermost layer of the substrate, and an adhesive layer is provided at the other side of the surfaces of the substrate, that is, onto the substrate layer.

An adhesive agent to form the adhesive layer is not particularly limited, and a general material may be used such as an acrylic-based, a rubber-based, a silicone-based material, etc., and an acrylic-based adhesive agent is preferred by taking adhesiveness at a low temperature, retaining property at a high temperature, in respect of cost, etc., into consideration.

The acrylic-based adhesive agent which can be used may be mentioned an acrylic-based adhesive agent containing an acrylic-based copolymer(s) (which may be two or more kinds) in which a monomer component mainly comprising an acrylic acid ester(s) is/are copolymerized with a monomer component having a functional group(s) such as a carboxyl group and a hydroxyl group, etc.

The acrylic acid ester may be mentioned, for example, methyl (meth)acrylate, ethyl (meth)acrylate, n-propyl (meth)acrylate, isopropyl (meth)acrylate, n-butyl (meth) acrylate, isobutyl (meth)acrylate, sec-butyl (meth)acrylate, t-butyl (meth)acrylate, pentyl (meth)acrylate, isopentyl (meth)acrylate, hexyl (meth)acrylate, cyclohexyl (meth) acrylate, heptyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth) acrylate, nonadecyl (meth)acrylate, eicosyl (meth)acrylate, isobornyl (meth)acrylate, 1-adamantyl (meth)acrylate, etc. These alkyl (meth)acrylates may be used a single kind or two or more kinds.

With the above-mentioned alkyl (meth)acrylate(s) may be copolymerized the following monomer component(s). A copolymerizable monomer component may be mentioned, for example, a monomer containing a carboxyl group such as (meth)acrylic acid, itaconic acid, maleic acid, crotonic acid, fumaric acid, carboxyethyl (meth)acrylate, carboxypentyl (meth)acrylate, etc.; a monomer containing a hydroxyl group such as 2-hydroxyethyl (meth)acrylate, 3-hydroxypropyl (meth)acrylate, 4-hydroxybutyl (meth) acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)-methyl acrylate, etc.; a glycidyl group-containing monomer such as glycidyl (meth)acrylate, methylglycidyl (meth)acrylate, etc.; a cyanoacrylate-based monomer such as acrylonitrile, methacrylonitrile, etc.; a nitrogen-containing monomer such as N,N-dimethylaminoethyl (meth)acrylate, N,N-dimethylaminopropyl (meth)acrylamide, N,N-dimethyl (meth)acrylamide, N,N-diethyl (meth)acrylamide, N-isopropyl (meth)acrylamide, N-hydroxyethyl (meth)acrylamide, (meth)acryloyl morpholine, N-vinyl-2-piperidone, N-vinyl-3-morpholinone, N-vinyl-2-caprolactam, N-vinyl-2-pyrrolidone, N-vinyl-1,3-oxazin-2-one, N-vinyl-3,5-morpholinedione, N-cyclohexylmaleimide, N-phenylmaleimide, N-acryloylpyrrolidine, t-butylaminoethyl (meth) acrylate, etc., a monomer such as styrene or a derivative of the styrene, vinyl acetate, etc. These monomers may be used one kind or two or more kinds by copolymerizing with the (meth)acrylic acid ester(s), if necessary.

The adhesive agent to be used in the present invention preferably contains at least one kind selected from the group consisting of 2-ethylhexyl acrylate and isononyl acrylate, and at least one kind of a carboxyl group-containing monomer selected from the group consisting of acrylic acid and methacrylic acid. That is, as the adhesive agent to be used in the present invention, a copolymer in which a main monomer such as 2-ethylhexyl acrylate, isononyl acrylate, etc., is copolymerized with a carboxyl group-containing monomer such as acrylic acid, methacrylic acid, etc., can be used.

A thickness of the adhesive layer is not particularly limited, and can be optionally set and generally preferably 20 µm or more, more preferably 30 µm or more, and particularly preferably 40 µm or more. Provided that the upper limit value is generally preferably 100 µm or so.

In the present invention, the adhesive layer can be formed, for example, by applying a method in which a solvent-based or an emulsion-based adhesive agent is directly coated onto the substrate layer and dried, a method in which these adhesive agents are coated onto a peeling paper to previously form an adhesive layer, and the adhesive layer is pasted to the substrate layer together, etc. It may be also applied a method in which a radiation curing type adhesive agent is coated onto the substrate layer, and the radiation is irradiated to both of the adhesive layer and the film to simultaneously cure the substrate layer and the adhesive layer to form a material.

The adhesive sheet of the present invention is required to be transparent for reflecting the color of the coating surface of the adherend, etc., as an appearance as such, but it may be used as a coating-substituted adhesive sheet by coloring with the same color as that of the coating surface, or coloring with a different color from the same using a pigment, etc.

In the adhesive sheet of the present invention, an application sheet may be used for improving an adhering operation of the adhesive sheet, for example, for positioning of adhesion, etc.

The adhesive sheet of the present invention is excellent in chemical resistance, that is, the chemical weight increased ratio such as an organic solvent, etc., is small, so that it is suitable for the uses where there is a possibility of contacting with chemicals such as an organic solvent, etc. Furthermore, according to the present invention, since an adhesive sheet excellent in followability to a curved surface can be realized, such an adhesive sheet can be adhered to also the adherend having a severe three-dimensionally curved surface and can show excellent adhering workability thereto. Accordingly, it is suitable as an adhesive sheet for protection of an adherend (a material to be adhered) having a large area, and an adherend having a severe three-dimensionally curved surface. It is also suitable for the uses of a multi-layered adhesive sheet for protection which is for protecting a coating surface of a transportation machine, for example, a motorcycle, a bicycle, a railroad vehicle, a ship, a snow mobile, a gondola, a lift, an escalator, an automobile, an aircraft, etc., in particular, an automobile, an aircraft, a motorcycle, etc., a light guide film of a mobile phone, a sealing material of an electrode substrate, a film for decoration of a handrail of an escalator, a transparent film used in combination with a transparent glass, etc.

EXAMPLES

In the following, the present invention is explained in detail by referring to Examples, but the present invention is not limited by these. Incidentally, in the following Examples, part(s) means part(s) by weight and % means % by weight within the range which does not cause any problems in the common knowledge, otherwise specifically mentioned.

In addition, the measurement method and the evaluation method used in the following Examples are shown below.
(Measurement Method and Evaluation Method)
(1) Evaluation of Flexibility (Measurement of Load at the Time of 5% Elongation)

An acrylic-based adhesive layer with a thickness of 50 µm was formed on one of the surfaces of the substrate to prepare an adhesive tape. Provided that in the case of the substrate having a substrate layer and a surface protective layer, the adhesive layer was formed onto the substrate layer. This adhesive tape was cut to a width of 10 mm and a length of 160 mm, and a tensile test was carried out with a tensile rate of 200 mm/min, a distance between chucks of 100 mm at 23° C. to obtain a stress-strain curve. A load at the time of 5% elongation of the adhesive sheet was obtained.

(2) Evaluation of Stress Relaxation Property (Measurement of Stress Relaxation Rate)

An acrylic-based adhesive layer with a thickness of 50 µm was formed on one of the surfaces of the substrate to prepare an adhesive sheet. Provided that in the case of the substrate having a substrate layer and a surface protective layer, the adhesive layer was formed onto the substrate layer. This adhesive sheet was cut to a width of 10 mm and a length of 160 mm, and at a tensile rate of 200 mm/min and a distance between chucks of 100 mm at 23° C., it was continued to tension until the distance between chucks became 110 mm and stopped at 10% elongated state. A load (residual stress)

after lapsing 600 seconds from the stopping was measured, and a stress relaxation rate was obtained by using the following calculation formula.

Stress relaxation rate (%)={(load at 10% elongation− load at 10% elongation after lapsing 600 seconds)/load at 10% elongation}×100

(3) Evaluation of Chemical Resistance

As the evaluation of chemical resistance, a weight increased ratio of a fuel such as gasoline, etc., was measured. That is, the substrate was cut to a width of 30 mm and a length of 30 mm to prepare samples for measurement. The sample for measurement was dipped into an organic solvent in which regular gasoline and ethanol had been mixed with a ratio of 90% by weight/10% by weight, and a weight after lapsing 30 minutes was measured. An increased ratio of the weight of chemicals (ex. an organic solvent) was obtained by using the following calculation formula.

Weight increased ratio (%)={(Weight after 30 minutes from dipping into chemicals−Weight before dipping)/Weight before dipping}×100

Example 1

A substrate comprising a substrate layer alone was prepared by using, as a substrate layer, a non-yellowing adipate ester-based thermoplastic polyurethane film having a thickness of 240 μm and a Shore hardness of 85 A.

With regard to the obtained substrate, measurement of the load at the time of 5% elongation, measurement of the stress relaxation rate and evaluation of the chemical resistance were carried out. The results were shown in Table 1.

Example 2

A substrate comprising a substrate layer alone was prepared by using, as a substrate layer, a non-yellowing caprolactone ester-based thermoplastic polyurethane film having a thickness of 240 μm and a Shore hardness of 95 A.

With regard to the obtained substrate, measurement of the load at the time of 5% elongation, measurement of the stress relaxation rate and evaluation of the chemical resistance were carried out. The results were shown in Table 1.

Example 3

A substrate comprising a substrate layer alone was prepared by using, as a substrate layer, a non-yellowing caprolactone ester-based thermoplastic polyurethane film having a thickness of 150 μm and a Shore hardness of 97 A.

With regard to the obtained substrate, measurement of the load at the time of 5% elongation, measurement of the stress relaxation rate and evaluation of the chemical resistance were carried out. The results were shown in Table 1.

Comparative Example 1

A substrate comprising a substrate layer alone was prepared by using, as a substrate layer, a non-yellowing carbonate-based thermoplastic polyurethane film having a thickness of 150 μm and a Shore hardness of 95 A.

With regard to the obtained substrate, measurement of the load at the time of 5% elongation, measurement of the stress relaxation rate and evaluation of the chemical resistance were carried out. The results were shown in Table 1.

Comparative Example 2

A substrate comprising a substrate layer alone was prepared by using, as a substrate layer, a non-yellowing ether-based thermoplastic polyurethane film having a thickness of 150 μm and a Shore hardness of 97 A.

With regard to the obtained substrate, measurement of the load at the time of 5% elongation, measurement of the stress relaxation rate and evaluation of the chemical resistance were carried out. The results were shown in Table 1.

Comparative Example 3

A substrate comprising a substrate layer alone was prepared by using, as a substrate layer, a non-yellowing ether-based thermoplastic polyurethane film having a thickness of 145 μm and a Shore hardness of 56 D.

With regard to the obtained substrate, measurement of the load at the time of 5% elongation, measurement of the stress relaxation rate and evaluation of the chemical resistance were carried out. The results were shown in Table 1.

Example 4

A non-yellowing caprolactone ester-based thermoplastic polyurethane film having a thickness of 240 μm and a Shore hardness of 95 A used in Example 2 was used as a substrate layer. Onto the film was coated a resin composition for a surface protective layer which had been obtained by mixing 100 parts of a 43% concentration solution of an acrylic-based resin ("HALS-hybrid UV-G301", trade name, available from NIPPON SHOKUBAI CO., LTD., a hydroxyl value of the (meth)acrylic-based polymer is 45 (KOH mg/g)) in ethyl acetate and 28.07 parts of isocyanate-based crosslinking agent ("Duranate TSE-100", trade name, available from Asahi Kasei Chemicals Corporation) to which 108.8 parts of ethyl acetate as a diluting solvent had been added, so that a thickness after curing became 10 μm, and it was dried and cured at a temperature of 120° C. for 2 minutes. The surface protective layer was thus formed onto the substrate layer to form a substrate. With regard to the obtained substrate, measurement of the load at the time of 5% elongation, measurement of the stress relaxation rate and evaluation of the chemical resistance were carried out. The results were shown in Table 1.

Example 5

A non-yellowing caprolactone ester-based thermoplastic polyurethane film having a thickness of 240 μm and a Shore hardness of 95 A used in Example 2 was used as a substrate layer. Onto the film was coated a resin composition for a surface protective layer which had been obtained by mixing 100 parts of a 70% concentration solution of an acrylic-based resin ("SETALUX D A 870BA", trade name, available from Nuplex Resins GmbH, a hydroxyl value of the (meth)acrylic-based polymer is 99 (KOH mg/g)) in butyl acetate and 34.00 parts of an isocyanate-based crosslinking agent ("Sumidur N3300", trade name, available from Sumika Bayer Urethane Ltd.) to which 51.31 parts of a mixed solvent of ethyl acetate and xylene (ethyl acetate/xylene=1/1 wt %) had been added as a diluting solvent, so that a thickness after curing became 10 μm, and it was dried and cured at a temperature of 120° C. for 2 minutes. The surface protective layer was thus formed onto the substrate layer to form a substrate. With regard to the obtained substrate, measurement of the load at the time of 5% elongation, measurement of the stress relaxation rate and evaluation of the chemical resistance were carried out. The results were shown in Table 1.

Example 6

A non-yellowing caprolactone ester-based thermoplastic polyurethane film having a thickness of 240 μm and a Shore hardness of 95 A used in Example 2 was used as a substrate layer. Onto the film was coated a resin composition for a surface protective layer which had been obtained by mixing 100 parts of a 50% concentration solution of a fluoroethylene/vinyl ether alternating copolymer ("LUMIFLON LF600", trade name, available from ASAHI GLASS CO., LTD.) in xylene and toluene and 9.51 parts of an isocyanate-based crosslinking agent ("Coronate HX", trade name, available from Nippon Polyurethane Industry Co., Ltd.) to which 76.46 parts of ethyl acetate had been added as a diluting solvent, so that a thickness after curing became 10 μm, and it was dried and cured at a temperature of 120° C. for 2 minutes. The surface protective layer was thus formed onto the substrate layer to form a substrate. With regard to the obtained substrate, measurement of the load at the time of 5% elongation, measurement of the stress relaxation rate and evaluation of the chemical resistance were carried out. The results were shown in Table 1.

Also, overall evaluation was carried out with regard to the substrates of Examples 1 to 6 and Comparative examples 1 to 3. That is, when it satisfies all the ranges of the load at the time of 5% elongation of 10 N/10 mm or less, the stress relaxation rate of 40% or more and 100% or less and the chemical weight increased ratio of 60% or less, then, it was designated by the symbol "○", while it does not satisfy either one of these, then, it was designated by the symbol "x".

TABLE 1

| | Substrate | | | Flexibility Load at 5% elongation (N/10 mm) | Stress relaxation Stress relaxation rate (%) | Chemical resistance Chemical weight increased ratio (%) | Overall evaluation |
|---|---|---|---|---|---|---|---|
| | Substrate layer | | Surface | | | | |
| | Material | Shore hardness | Thickness (μm) | protective layer | | | | |
| Example 1 | Non-yellowing adipate-based TPU | 85A | 240 | None | 2.88 | 49.80 | 33.23 | ○ |
| Example 2 | Non-yellowing caprolactone ester-based TPU | 95A | 240 | None | 4.17 | 56.03 | 24.07 | ○ |
| Example 3 | Non-yellowing caprolactone ester-based TPU | 97A | 150 | None | 5.76 | 70.50 | 45.10 | ○ |
| Example 4 | Non-yellowing caprolactone ester-based TPU | 95A | 240 | Present | 7.80 | 65.56 | 46.18 | ○ |
| Example 5 | Non-yellowing caprolactone ester-based TPU | 95A | 240 | Present | 6.68 | 67.57 | 58.23 | ○ |
| Example 6 | Non-yellowing caprolactone ester-based TPU | 95A | 240 | Present | 9.26 | 71.96 | 57.77 | ○ |
| Comparative example 1 | Non-yellowing carbonate-based TPU | 95A | 150 | None | 6.57 | 29.90 | 13.53 | x |
| Comparative example 2 | Non-yellowing ether-based TPU | 97A | 150 | None | 7.10 | 68.80 | 72.05 | x |
| Comparative example 3 | Non-yellowing ether-based TPU | 56D | 145 | None | 15.75 | 74.50 | 66.44 | x |

As can be clearly seen from Table 1, it could be understood that the substrates of Example 1 to 6 had a load at the time of 5% elongation of 15 N/cm or less, the stress relaxation rate of 40% or more, and the chemical resistance (the chemical weight increased ratio) of less than 60%.

Adhesive sheets were prepared by using the substrates of Examples 1 to 6.

<<Preparation of Adhesive Layer>>

To a mixture in which 90 parts of isononyl acrylate and 10 parts of acrylic acid had been mixed as monomer components were formulated 0.05 part of "Irgacure 651" (trade name, available from Ciba Speciality Chemicals Corporation) and 0.05 part of "Irgacure 184" (trade name, available from Ciba Speciality Chemicals Corporation) as photopolymerization initiators, and ultraviolet ray was irradiated until the viscosity became about 25 Pa·s (BH viscometer No. 5 rotor, 10 rpm, measurement temperature 30° C.) to prepare an acrylic composition (UV syrup) a part of which has been polymerized.

To 100 parts of the obtained UV syrup were added 0.20 part of isononyl acrylate, 0.20 part of trimethylol propane triacrylate and 1 part of a hindered phenol type antioxidant (trade name: "Irganox 1010", available from Ciba Speciality Chemicals Corporation) to prepare an adhesive composition.

This adhesive composition was coated, as a temporary support 2, onto a peeling treatment surface of the polyethylene terephthalate film with a thickness of 50 μm so that a thickness as the final product became 50 μm.

A PET film which had been subjected to peeling treatment was overlapped thereon as a separator and covered, then, ultraviolet ray (illumination: 290 mW/cm², light quantity: 4,600 mJ/cm²) was irradiated to the PET film surface by using a metal halide lamp to cure the same to form an adhesive layer on a temporary support 2. Thereafter, it was dried at 140° C. for 3 minutes to dry the unreacted residual acrylic-based monomer to prepare an adhesive layer.

<<Preparation of Adhesive Sheet>>

The separator was then removed, and adhesive sheets were prepared by using the substrates of Examples 1 to 6.

That is, with regard to the substrates obtained in Examples 1 to 3, an adhesive layer was laminated to one of the surfaces of the substrate so that they were overlapped to prepare an adhesive sheet (a layer constitution is a temporary support 1/a substrate/an adhesive layer/a temporary support 2).

Also, with regard to the substrates obtained in Examples 4 to 6, an adhesive layer was laminated to the opposite side surface (i.e., the substrate layer surface) from the surface protective layer side surface of the substrate so that they were overlapped to prepare an adhesive sheet (a layer constitution is a temporary support 1/a surface protective layer/a substrate layer/an adhesive layer/a temporary support 2).

The respective adhesive sheets obtained by using the substrates of Examples 1 to 6 have been found that each is excellent in curved surface followability and well followed to the portion having a three-dimensionally curved surface, can be neatly adhered without repelling or floating after the adhesion, and excellent chemical resistance can be realized.

That is, according to the present invention, an adhesive sheet excellent in all of flexibility, a stress relaxation rate and chemical resistance could be realized.

UTILIZABILITY IN INDUSTRY

The adhesive sheet of the present invention can be suitably used as an adhesive sheet for protection which is required to have resistance to chemicals such as an organic solvent, etc. Also, the adhesive sheet of the present invention can be suitably used as an adhesive sheet which is further required to have flexibility to a curved surface, etc., in particular, it can be suitably used for an adherend (a material to be adhered) having a severe three-dimensionally curved surface. It can be used as an adhesive sheet for protecting a coating film surface exposed to a harmful environment including, for example, weather outdoors, a solvent, dust, oil and fats, and marine environment, etc., or an adhesive sheet for decoration. In addition, it is also suitable as a chipping tape for protecting a coating film of a body of an automobile, etc., an adhesive sheet for a body protection film or an adhesive sheet.

The invention claimed is:

1. An adhesive sheet which comprises
a substrate and an adhesive layer,
wherein the substrate consists of a substrate layer containing a urethane-based polymer and a surface protective layer comprising an acrylic-based resin or a fluorine-based resin as an effective ingredient,
the surface protective layer is provided at the outermost surface of the adhesive sheet,
the adhesive layer is directly on the substrate layer, and
a thickness of the substrate layer is 150 μm or more,
wherein the urethane-based polymer is a non-yellowing ester-based thermoplastic polyurethane,
a load at the time of 5% elongation of the substrate is 15 N/cm or less,
a stress relaxation rate of the substrate by elongating to 10%, stopping the elongation at that state and after lapsing 600 seconds is 40% or more and 100% or less, and
a chemical weight increased ratio of the substrate is 60% or less.

2. The adhesive sheet according to claim 1, wherein the load at the time of 5% elongation of the substrate is 1 N/cm or more and 15 N/cm or less.

3. The adhesive sheet according to claim 1, wherein a Shore hardness of the substrate layer is 80 A or more and 65 D or less.

4. The adhesive sheet according to claim 1 wherein the acrylic-based resin contains a (meth)acrylic-based polymer having a hydroxyl value of 20 to 120 (KOH mg/g).

5. The adhesive sheet according to claim 1, wherein the adhesive sheet is used as a protective sheet for protecting the surface of an adherend.

6. The adhesive sheet according to claim 1 wherein the fluorine-based resin contains a fluoroethylene vinyl ether alternating copolymer.

7. The adhesive sheet according to claim 1 wherein the acrylic-based resin is a HALS-hybrid (meth)acrylic-based polymer.

8. The adhesive sheet according to claim 1, wherein the substrate layer has a thickness of 150 μm to 1 mm.

9. The adhesive sheet according to claim 1, wherein a thickness of the surface protective layer is 2 to 40 μm.

10. The adhesive sheet according to claim 1, wherein the surface protective layer is formed by adding a crosslinking agent to a resin for forming the surface protective layer.

11. The adhesive sheet according to claim 10, wherein the crosslinking agent is at least one selected from the group consisting of an isocyanate-based crosslinking agent and an oxazoline-based crosslinking agent.

12. The adhesive sheet according to claim 1, wherein the surface protective layer is formed by coating a coating solution for surface protective layer onto the substrate layer.

\* \* \* \* \*